March 23, 1937.  E. M. MOREHOUSE  2,074,617
HYDRAULIC TRANSMISSION FOR VEHICLE BRAKES
Filed July 25, 1935   3 Sheets-Sheet 1

Inventor
Eugene M. Morehouse
By
R. S. Brush
Att'y.

March 23, 1937.  E. M. MOREHOUSE  2,074,617
HYDRAULIC TRANSMISSION FOR VEHICLE BRAKES
Filed July 25, 1935   3 Sheets-Sheet 2

Inventor
Eugene M. Morehouse
By
R. S. Burry
Atty.

March 23, 1937.  E. M. MOREHOUSE  2,074,617
HYDRAULIC TRANSMISSION FOR VEHICLE BRAKES
Filed July 25, 1935  3 Sheets-Sheet 3
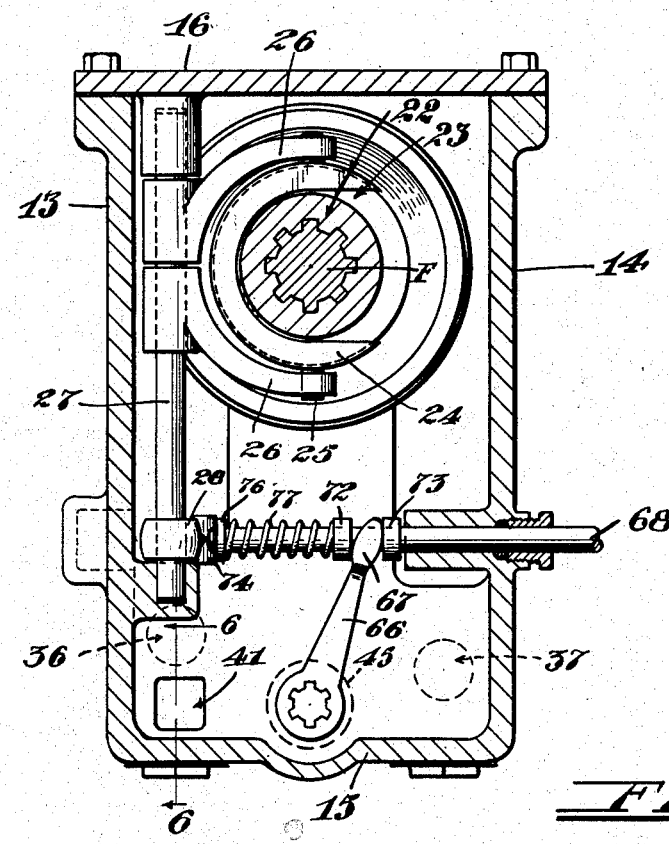
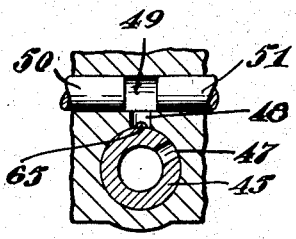
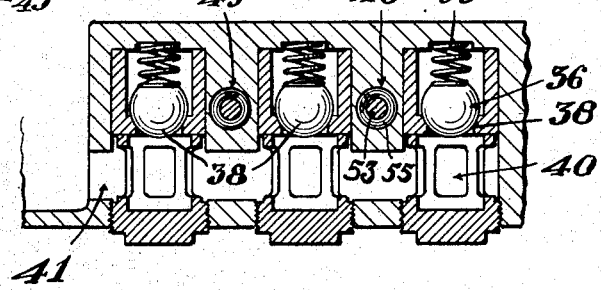
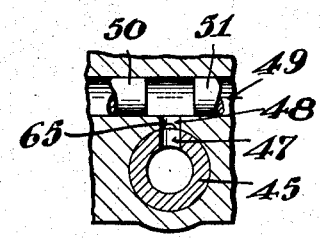
Inventor
Eugene M. Morehouse
By R. S. Berry
Att'y.

Patented Mar. 23, 1937

2,074,617

UNITED STATES PATENT OFFICE 2,074,617

HYDRAULIC TRANSMISSION FOR VEHICLE BRAKES

Eugene M. Morehouse, Tujunga, Calif., assignor to Clyde A. Roeder, Omaha, Nebr.

Application July 25, 1935, Serial No. 33,011

5 Claims. (Cl. 188—2)

This invention relates to a hydraulic transmission for vehicle brakes and more particularly pertains to a transmission mechanism for actuating brakes of engine driven vehicles from the engine driven shaft, under manual control.

An object of the invention is to provide a hydraulic transmission of the above character embodying a construction whereby the transmission mechanism is normally out of operative connection with the engine driven shaft and whereby no torque will be applied to the shaft by reason of the connection thereto of the brake actuating transmission except when the vehicle brakes are applied.

Another object is to provide a hydraulic transmission for actuating vehicle brakes embodying a plurality of eccentrically operated pumps for developing hydraulic pressure, with manually operable clutch means for placing the pumps in and out of operative connection with the engine driven shaft through the pump operating eccentrics.

Another object is to provide an arrangement in the transmission mechanism that while the pressure developing pumps are operatively connected to the engine driven shaft, the fluid pressure may be by-passed with the brake mechanism out of operative relation thereto, and whereby a resistance will be offered to operation of the pumps to effect a retarding torque action on the engine shaft so as to enable retarding movement of a vehicle, as on coasting downgrade or initially slackening speed without effecting application of the vehicle brakes and thus minimizing wear of the brakes.

A further object is to provide a mechanism of the above character which is extremely compact and is adapted to be associated with the driven shaft of the change speed transmission of a motor vehicle.

Various additional objects and features of the invention will appear and will be more fully understood from the following detailed description of a present preferred embodiment thereof, reference for this purpose being had to the accompanying drawings in which:

Fig. 5 is a view in section and elevation taken on the line 5—5 of Fig. 2, as seen in the direction indicated by the arrows:

Fig. 6 is a detail in vertical section partly in elevation as seen on the line 6—6 of Fig. 5 as seen in the direction indicated by the arrows:

Fig. 7 is a detail in section taken on the line 7—7 of Fig. 2 as seen in the direction indicated by the arrows showing the brake control valve in its normal position:

Fig. 8 is a view similar to Fig. 7 showing the brake control valve in its open position.

Figure 1:
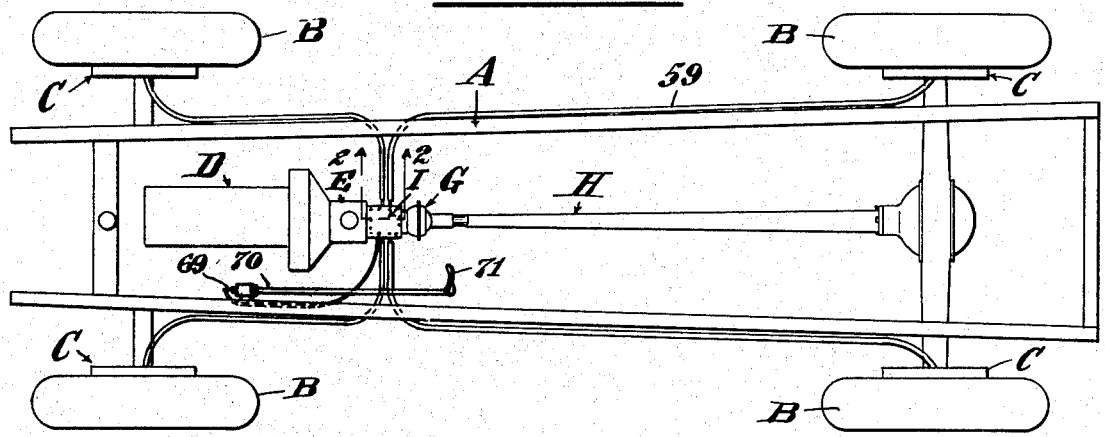
Fig. 1 is a plan view of a motor vehicle running gear illustrating the application of the invention.
Figure 2:
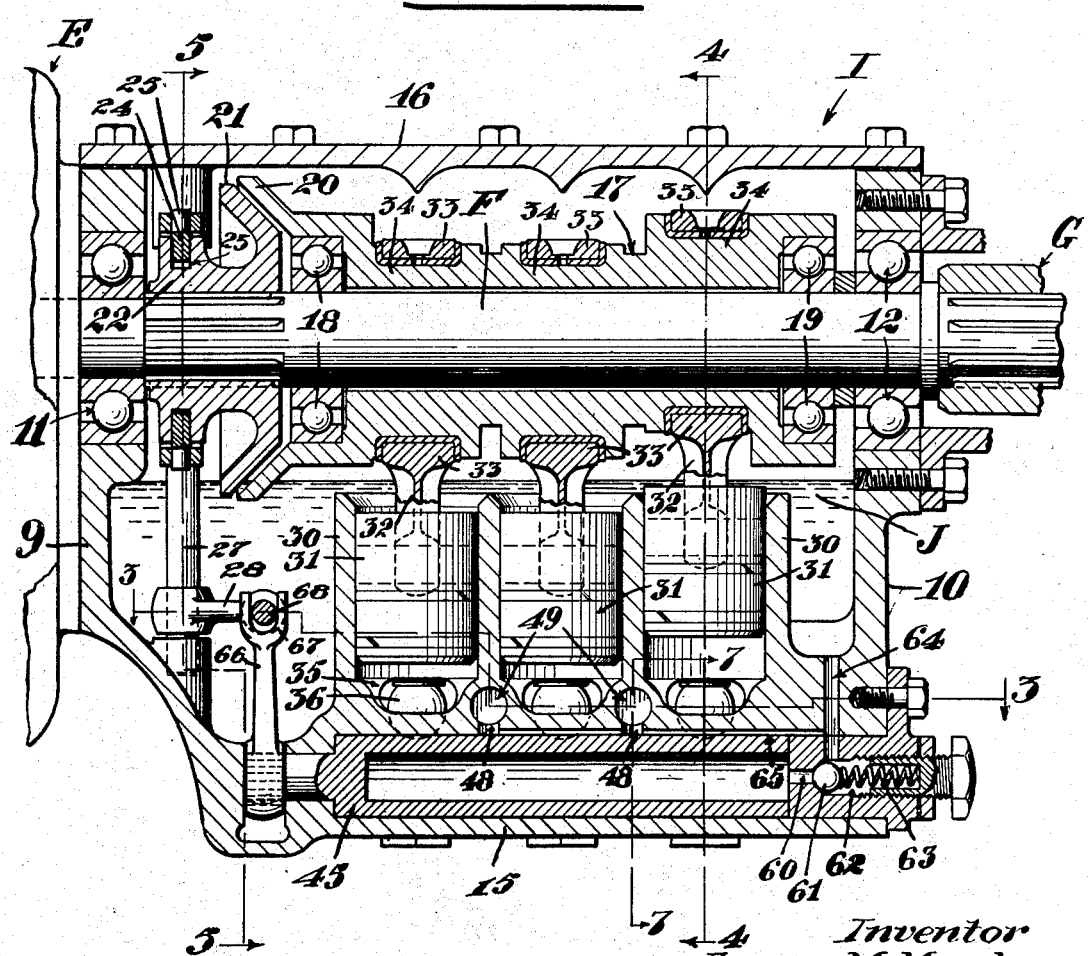
Fig. 2 is an enlarged detailed section and elevation of the hydraulic transmission mechanism as seen on the line 2—2 of Fig. 1 in the direction indicated by the arrows.
Figure 3:
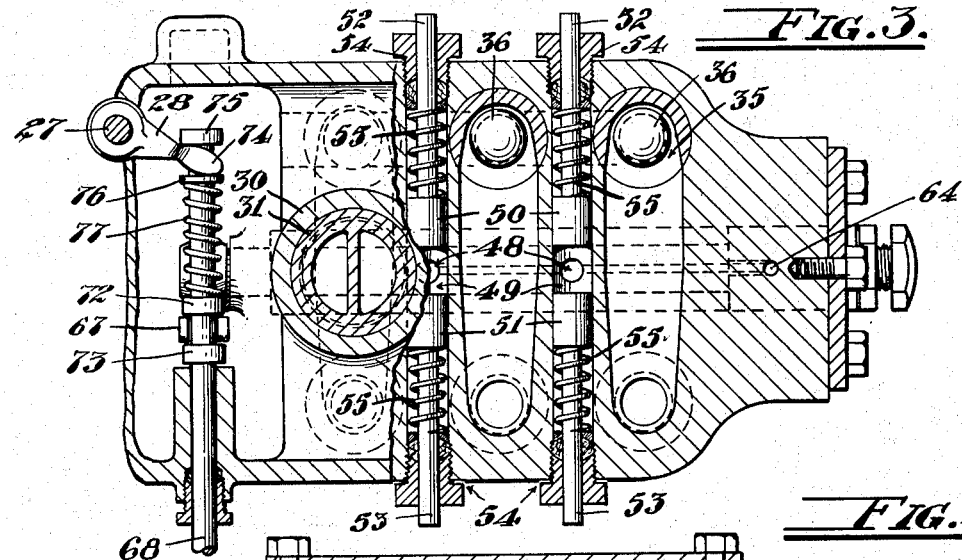
Fig. 3 is a detail in horizontal section and plan as viewed on the line 3—3 of Fig. 2.

Referring to the drawings more specifically A indicates generally a motor vehicle frame, B denotes the vehicle wheels on which the frame A is carried in a usual fashion, C designates the vehicle brake housings associated with the wheels, D denotes the vehicle engine, E a transmission housing, F an engine driven shaft leading from the housing, and G a universal joint housing interposed between the shaft F and a housing H containing the vehicle drive shaft.

In carrying out the present invention a housing I is interposed between the gear case E and the universal joint housing G and through which housing I the shaft F extends; the housing I including end walls 9 and 10 carrying bearings 11 and 12 in which shaft F is journalled.

The housing I also includes side walls 13 and 14 and a bottom wall 15 formed integral with the end walls 9 and 10, and is fitted with a removable cover 16, and forms a receptacle or sump for a hydraulic transmission fluid indicated at J.

Loosely encircling the shaft F within the housing I is a sleeve 17 between which and the shaft F is interposed ball bearings 18—19 whereby rotation of the shaft F may be effected without rotating the sleeve 17.

The end of the sleeve 17 extending toward the gear box E is formed with a flange 20 constituting one member of a friction clutch the other member 21 of which is carried on a sleeve 22 splined on the shaft F. The sleeve 22 has an annular channel 23 engaged by a yoke 24 having trunnions 25 connected to arms 26 on a rock shaft 27 fitted with a lever arm 28 connecting with a manually controlled operating mechanism, as will be later described, whereby the clutch member 21 is moved into operative engagement with the clutch member 20 thereby placing the sleeve 17 into operative connection with the shaft F.

Arranged interiorly of the housing I is a series of pump cylinders 30 each of which is fitted with a reciprocal piston 31; the cylinders 30 extending in a row beneath the shaft F and opening toward the latter and the pistons 31 being fitted with connecting rods 32 leading to sleeves 33 which encircle eccentrics 34 formed on the sleeve 17.

As here shown three of such pump cylinders with their associated pistons and eccentrics are provided, but manifestly this number of pumps may be increased or diminished as occasion may require.

The lower end of each of the pump cylinders 30 communicates with a transverse passage 35 one end of which is fitted with an intake valve 36 and the other end of which is fitted with a discharge valve 37. The valve 36 is in the form of a ball which seats on the margin of an opening 38 under the urge of a spring 39 and normally closes communication between the pump cylinder and a passage 40 leading to an opening 41 in a wall of the pump structure communicating with the sump in the housing I containing the liquid J.

The valve 37 comprises a ball which normally closes an opening 42 under the urge of a spring 43, and which opening leads to a passage 44 leading through the housing of a tubular rotary valve 45 which valve has circumferentially elongated ports 46 affording at all times a communication between the passage 44 and the interior of the valve 45 irrespective of turning movement of the latter.

The valve 45 is also formed with a pair of ports 47 as shown in Fig. 7 which are adapted to be disposed in and out of communication with a pair of ports 48 in the wall of the housing of the valve 45. The ports 48 communicate with a pair of bores 49 each of which contains a pair of spaced pistons 50—51 arranged on opposite sides of the port 48; the pistons 50—51 being fitted with stems 52 and 53 respectively which pass through packing glands 54 in the ends of the bores 49.

Springs 55 wound around the stems 52 and 53 in the bores 49 between the pistons 50 and 51 and the glands 54 act to normally maintain the pistons 50 and 51 in retracted position.

Figure 4:
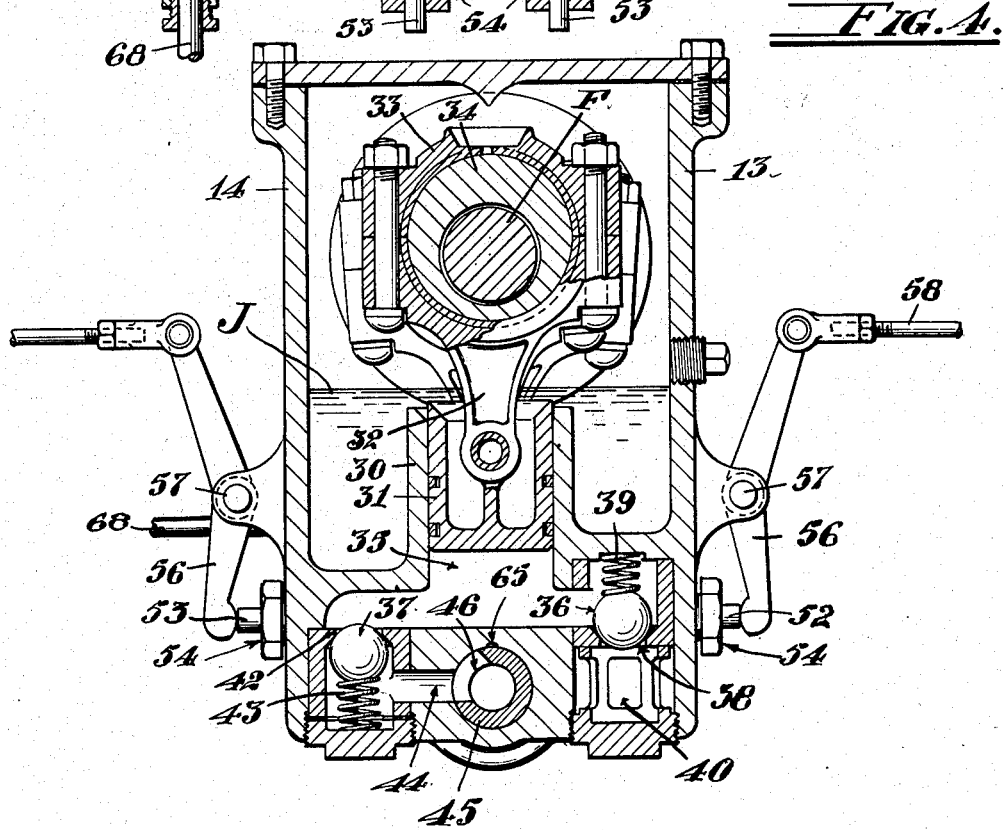
Fig. 4 is a view in vertical transverse section taken on the line 4—4 of Fig. 2 as seen in the direction indicated by the arrows.

The stems 52 and 53 are here shown in Fig. 4 as arranged to abut against the inner ends of rocker arms 56, pivoted at 57 and having connecting rods 58 on their outer ends for effecting operation of a mechanical brake, the rods leading through conduits 59 to brake mechanism in the brake drums C to operate the brakes in a well known manner.

It will be understood however that movement of the reciprocal pistons 50 and 51 may be employed to effect operation of hydraulic brakes in a usual fashion not necessary to be here shown.

The tubular rotary valve 45 opens at one end to a port 60 normally closed by a ball valve 61 in a valve chamber 62 under the urge of a spring 63 from which chamber leads a passage 64 communicating with the sump in the housing I, for the purpose of by-passing liquid through the valve 45 as will presently be described, and formed in the wall of the housing of the valve 45 is a restricted passage 65 affording a communication between the ports 48 and the passage 64 for relieving pressure between the pistons 50—51 to release the brakes.

The valve 45 is fitted at one end thereof with a lever arm 66 fitted with a yoke 67 engaged by a push rod 68, as shown in Fig. 5, and which rod leads to any suitable means of manual control being here shown in Fig. 1 as connecting with an arm 69 on a rock shaft 70 extending alongside the steering column of the motor vehicle and fitted with a hand lever 71 adjacent the steering wheel, whereby manipulation of the lever 71 will turn the shaft 70 and cause the arm 69 to shift the rod 68 longitudinally and thereby rock the arm 66 through a pair of spaced collars 72—73 fixed on the rod 68 and between which the yoke 67 extends.

The push rod 68 is also connected to the rock shaft 27 for actuation of the latter; a yoke 74 on the arm 28 extending astride the rod 28 between a fixed collar 75 and a loose sleeve 76 on the rod 28. A spring 77 wound around the rod 68 bears between the collar 72 and the sleeve 76 and is tensioned to yieldably maintain the sleeve against the yoke 74 so that advance movement of the rod 28 will rock the shaft 27 to apply the clutch member 21.

In the operation of the invention, rotation of the engine driven shaft F effects rotation of the clutch member 21 by reason of the splined connection of the latter, and when it is desired to retard movement of the vehicle the operator turns the rock shaft 70 and thereby advances the clutch member 21 (through the action of the push rod 68, yoke 74, arm 28, rock shaft 27, arm 26 and yoke 24) into frictional engagement with the clutch member 20 on the sleeve 17, thereby effecting a frictional drive or rotation of the latter from the shaft F thus revolving the eccentrics 34 and causing the latter to effect reciprocation of the pump pistons 31 through the connecting rods 32 and sleeves 33. Reciprocation of the pistons 31 acts to draw liquid from the sump through the passages 40 and valve openings 38 on upstroke of the pistons; the valves 36 then opening in opposition to the springs 39. On downstroke of the pistons the liquid therebeneath will be discharged through the openings 42 past the valves 37 which will then open in opposition to the springs 43, and such pumped liquid will be delivered through the passages 44 and ports 46 into the interior of the valve 45. Liquid previously entrapped in the valve 45 will be displaced and directed through the passage 60, past valve 61, and through passage 64 back to the sump under resistance afforded by the restriction of the passage 60.

A back pressure is thus imposed on the pump pistons thereby imposing a load on the shaft F and effecting retardation thereof to initially retard movement of the vehicle. During this initial operation the valve 45 is turned insufficiently to open the ports 48, but on further advance of the rod 68 sleeve 76 backed by spring 77 yields allowing the valve 45 to be further moved so that ports 47 open to ports 48 whereupon pumped liquid will flow through the ports 48 into the bores 49 and being under pump pressure will act to force the pistons 50 and 51 outwardly in opposed relation to each other thereby causing the stems 52 and 53 to move outwardly and effect application of the vehicle brakes, as through the levers 56 and rods 58, in a conventional manner. In event of excess pressure being built up interiorly of the valve 45 a portion of the liquid pumped into the valve will be by-passed back to the sump through the port 60, past the valve 61 and through the passage 64.

When it is desired to release the brakes the clutch member 21 is placed out of operative engagement with the clutch member 20 thus terminating operation of the pump pistons whereupon the brake actuating pistons 50 and 51 are returned to normal forcing a portion of the liquid out of the bores 49 back into the sump through the vent passage 65 and passage 64.

Where it is desired to effect resistance to rotation of the shaft F where the latter is being driven by rotation of the vehicle wheels in coasting, the hand lever 71 is operated as before described to place the clutch member 21 in engagement with the clutch member 20 and thereby effect operation of the pump pistons so that the latter will act to effect circulation of the liquid.

The resistance afforded to such circulation of the pumped liquid as before stated imposes a torque on the shaft F tending to retard rotation thereof and thus effecting a braking action on the coasting vehicle independent of the brakes on the vehicle wheels.

I claim:

1. In a brake applicator, an engine driven shaft, a liquid containing housing, a pump for circulating the liquid in said housing, brake operating mechanism controlled by liquid pressure developed by said pump, means for relieving pump pressure on the latter reaching a predetermined amount, a valve for controlling circulation of the liquid and for placing said brake operating mechanism in and out of operative relation to said pump, means for placing said pump in and out of operative relation to said shaft, and manually operated means for collectively effecting operation of said last named means and of said valve including means for placing said pump in operative relation to said shaft in advance of operation of said valve to effect actuation of said brake operating mechanism.

2. In a brake applicator, an engine driven shaft, a pump, normally inoperative means for driving said pump from said shaft, a clutch for effecting connection between said shaft and said pump driving means, liquid pressure operated brake applying mechanism, a liquid containing housing associated with said pump, said pump adapted to effect circulation of liquid in said housing, a valve for controlling circulation of the liquid and for placing said brake operating means in and out of operative influence of liquid pressure developed by said pump, means for relieving pump pressure on the latter reaching a predetermined amount, a manually operable push rod, and connections between said push rod and said clutch and said valve for collectively operating said clutch and valve including means whereby said clutch will be applied to effect operation of said pump before said valve is operated to effect actuation of the brake operating mechanism.

3. In a brake applicator, an engine driven shaft, a pump, normally inoperative means for driving said pump from said shaft, a clutch for effecting connection between said shaft and said pump driving means, liquid pressure operated brake applying mechanism, a liquid containing housing associated with said pump, said pump adapted to effect circulation of liquid in said housing, a valve for controlling circulation of the liquid and for placing said brake operating means in and out of operative influence of liquid pressure developed by said pump, means for relieving pump pressure on the latter reaching a predetermined amount, a manually operable push rod, and connections between said push rod and said clutch and said valve for collectively operating said clutch and valve including means whereby said clutch will be applied to effect operation of said pump before said valve is operated to effect actuation of the brake operating mechanism, and means for creating back pressure on said pump in the interval between operation of said clutch and valve.

4. In a brake applicator, a liquid containing housing, a pump adapted to circulate liquid in said housing, liquid pressure actuated brake operating mechanism associated with said housing, means for relieving pump pressure on the latter reaching a predetermined amount, a valve controlling circulation of liquid by said pump adapted to place said brake operating mechanism in and out of operative relation to said pump, a power driven vehicle propelling shaft, normally inoperative means for driving said pump from said shaft, a clutch for placing said pump driving means in operative connection with said shaft, a single manually controlled operative connection between said clutch and valve, said connection including means for engaging said clutch in advance of operating said valve to place said brake mechanism in operative relation to said pump.

5. In a vehicle brake applicator, a revoluble shaft, a sleeve encompassing said shaft, a clutch member on said sleeve, a second such member splined on said shaft, manually controlled means for placing said clutch members in operative engagement with each other, a liquid containing housing encompassing said shaft, sleeve and clutch members; a pump in said housing, an eccentric on said sleeve, operating connections between said pump and eccentric, said pump being adapted to effect circulation of liquid within said housing, brake applying means operable by liquid pressure developed by said pump including a pair of reciprocal pistons, means for relieving pump pressure on the latter reaching a predetermined amount, valve controlled means for directing liquid between said pistons and said pump, and means for venting liquid from between the pistons apart from the pump after communication between the pump and pistons is cut off.

EUGENE M. MOREHOUSE.